United States Patent
Huang et al.

(10) Patent No.: US 10,911,108 B2
(45) Date of Patent: Feb. 2, 2021

(54) TRANSMISSION OPPORTUNITY (TXOP) DURATION FIELD DISABLE SETTING IN HIGH EFFICIENCY SIGNAL A (HE-SIG-A)

(71) Applicant: Intel IP Corporation, Santa Clara, CA (US)

(72) Inventors: Po-Kai Huang, San Jose, CA (US); Daniel F. Bravo, Hillsboro, OR (US); Robert J. Stacey, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 16/560,595

(22) Filed: Sep. 4, 2019

(65) Prior Publication Data
US 2019/0393934 A1   Dec. 26, 2019

Related U.S. Application Data

(63) Continuation of application No. 15/386,945, filed on Dec. 21, 2016, now Pat. No. 10,439,687.
(Continued)

(51) Int. Cl.
*H04B 7/0452* (2017.01)
*H04W 72/04* (2009.01)
(Continued)

(52) U.S. Cl.
CPC ....... *H04B 7/0452* (2013.01); *H04L 27/2602* (2013.01); *H04L 69/322* (2013.01);
(Continued)

(58) Field of Classification Search
CPC .. H04B 7/0452; H04B 7/0456; H04B 7/0478; H04B 7/0621; H04B 7/0639;
(Continued)

(56) References Cited

U.S. PATENT DOCUMENTS

| 8,634,336 B2 | 1/2014 | Kang et al. |
| 9,408,230 B2 | 8/2016 | Zhu et al. |

(Continued)

OTHER PUBLICATIONS

"U.S. Appl. No. 15/386,945, Advisory Action dated May 15, 2019", 5 pgs.
(Continued)

*Primary Examiner* — Alpus Hsu
(74) *Attorney, Agent, or Firm* — Schwegman Lundberg & Woessner, P.A.

(57) ABSTRACT

Methods, computer readable media, and wireless apparatuses are disclosed for a TXOP duration field disable setting in a HE preamble, such as HE-SIG-A. An apparatus of a wireless device can include processing circuitry configured to decode a HE PPDU received from a second wireless device, the HE PPDU including a first TXOP duration field in a PHY portion of the HE PPDU. The processing circuitry can detect whether the TXOP duration field includes a disable flag based on bit values of the TXOP duration field. The disable flag can indicate absence of duration information in the TXOP duration field. Upon detecting the disable flag, a response HE PPDU can be encoded for transmission to the second wireless device. The response HE PPDU can include a second TXOP duration field with a disable flag within a PHY portion of the response HE PPDU.

20 Claims, 7 Drawing Sheets

Related U.S. Application Data

(60) Provisional application No. 62/363,420, filed on Jul. 18, 2016.

(51) Int. Cl.
  *H04L 29/08* (2006.01)
  *H04L 27/26* (2006.01)
  *H04W 74/00* (2009.01)
  *H04W 84/12* (2009.01)
  *H04W 88/08* (2009.01)

(52) U.S. Cl.
  CPC ..... *H04W 72/0446* (2013.01); *H04W 74/002* (2013.01); *H04W 84/12* (2013.01); *H04W 88/08* (2013.01)

(58) Field of Classification Search
  CPC ............. H04L 27/2601; H04L 27/2602; H04L 27/2675; H04L 61/6022; H04L 69/322; H04L 69/323; H04W 16/14; H04W 28/06; H04W 72/0446; H04W 72/1205; H04W 72/1278; H04W 74/002; H04W 88/08
  See application file for complete search history.

(56) References Cited

U.S. PATENT DOCUMENTS

| | | | |
|---|---|---|---|
| 9,622,262 B2 | 4/2017 | Zhu et al. | |
| 9,825,678 B2 | 11/2017 | Chu et al. | |
| 9,854,606 B2 * | 12/2017 | Seok | H04W 74/04 |
| 9,894,653 B2 * | 2/2018 | Huang | H04W 72/0446 |
| 9,917,933 B2 * | 3/2018 | Seok | H04L 69/22 |
| 9,924,540 B2 * | 3/2018 | Huang | H04W 74/0808 |
| 10,045,340 B1 | 8/2018 | Chu et al. | |
| 10,116,360 B2 | 10/2018 | Seok | |
| 10,116,361 B2 * | 10/2018 | Hedayat | H04W 74/006 |
| 10,178,634 B2 | 1/2019 | Huang et al. | |
| 10,178,705 B2 * | 1/2019 | Seok | H04L 1/0075 |
| 10,182,362 B2 * | 1/2019 | Huang | H04W 24/08 |
| 10,212,731 B2 | 2/2019 | Ryu et al. | |
| 10,257,857 B2 * | 4/2019 | Noh | H04W 72/042 |
| 10,285,203 B2 | 5/2019 | Hedayat et al. | |
| 10,327,226 B2 * | 6/2019 | Seok | H04W 72/005 |
| 10,383,091 B2 * | 8/2019 | Chu | H04L 5/0007 |
| 10,524,231 B2 * | 12/2019 | Kim | H04W 84/12 |
| 2016/0150505 A1 | 5/2016 | Hedayat | |
| 2016/0227533 A1 | 8/2016 | Josiam et al. | |
| 2017/0006608 A1 | 1/2017 | Josiam et al. | |
| 2017/0094685 A1 | 3/2017 | Noh et al. | |
| 2017/0126384 A1 * | 5/2017 | Noh | H04L 1/1854 |
| 2017/0201956 A1 * | 7/2017 | Huang | H04W 74/006 |
| 2017/0265129 A1 * | 9/2017 | Chen | H04L 5/0048 |
| 2018/0020448 A1 | 1/2018 | Huang et al. | |
| 2018/0048427 A1 * | 2/2018 | Lou | H04L 61/6022 |
| 2018/0063824 A1 | 3/2018 | Kim et al. | |
| 2018/0098352 A1 | 4/2018 | Kim et al. | |
| 2018/0115947 A1 | 4/2018 | Kim et al. | |
| 2018/0176865 A1 | 6/2018 | Kim et al. | |
| 2018/0310330 A1 | 10/2018 | Chun et al. | |
| 2018/0324851 A1 * | 11/2018 | Zhang | H04W 74/006 |
| 2018/0359807 A1 * | 12/2018 | Kim | H04L 5/0094 |

OTHER PUBLICATIONS

"U.S. Appl. No. 15/386,945, Final Office Action dated Mar. 21, 2019", 13 pgs.

"U.S. Appl. No. 15/386,945, Non Final Office Action dated Oct. 12, 2018", 9 pgs.

"U.S. Appl. No. 15/386,945, Notice of Allowance dated May 28, 2019", 6 pgs.

"U.S. Appl. No. 15/386,945, Response filed May 16, 2019 to Advisory Action dated May 15, 2019", 10 pgs.

"U.S. Appl. No. 15/386,945, Response filed Sep. 19, 2018 to Restriction Requirement dated Jul. 19, 2018", 6 pgs.

"U.S. Appl. No. 15/386,945, Response filed Jan. 11, 2019 to Non Final Office Action dated Oct. 12, 2018", 11 pgs.

"U.S. Appl. No. 15/386,945, Response filed May 7, 2019 to Final Office Action dated Mar. 21, 2019", 10 pgs.

"U.S. Appl. No. 15/386,945, Restriction Requirement dated Jul. 19, 2018", 6 pgs.

* cited by examiner

US 10,911,108 B2

TRANSMISSION OPPORTUNITY (TXOP) DURATION FIELD DISABLE SETTING IN HIGH EFFICIENCY SIGNAL A (HE-SIG-A)

PRIORITY CLAIM

This application is a continuation of U.S. patent application Ser. No. 15/386,945, filed Dec. 21, 2016, which claims the benefit of priority under 35 USC 119(e) to U.S. Provisional Patent Application Ser. No. 62/363,420, filed Jul. 18, 2016, titled "TRANSMISSION OPPORTUNITY (TXOP) DURATION FIELD DISABLE SETTING IN HIGH EFFICIENCY SIGNAL A (HE-SIG-A)," each of which application is incorporated herein by its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for transmission opportunity (TXOP) duration field disable setting in high efficiency (HE) signal A field (HE-SIG-A).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
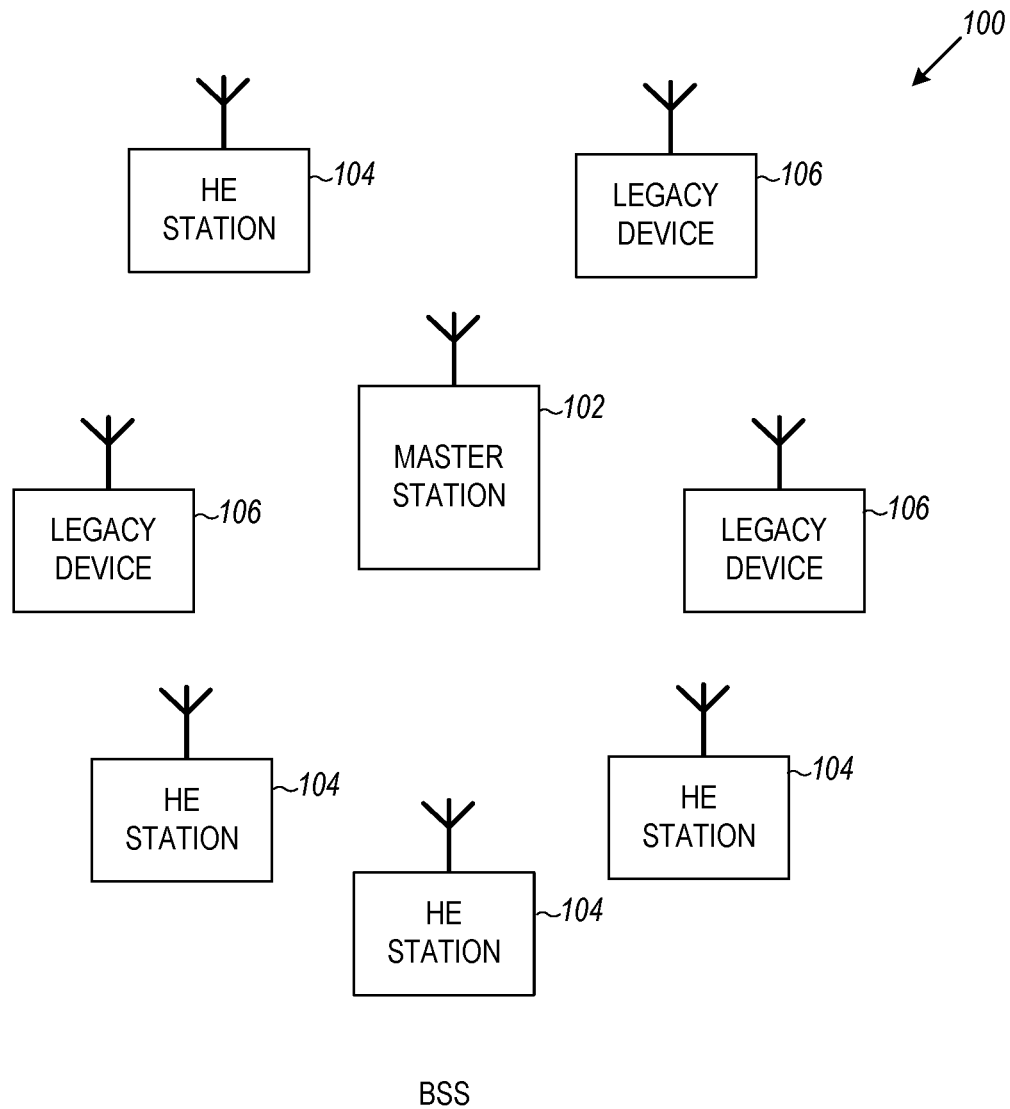
FIG. 1 illustrates a WLAN in accordance with some embodiments.

FIG. 1 illustrates a WLAN 100 in accordance with some embodiments. The WLAN 100 may comprise a basic service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a PPDU.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

In some embodiments, the master station 102 can be referred to as a TXOP holder, while a HE STA 104 can be referred to as a TXOP responder.

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-6.

Figure 2:
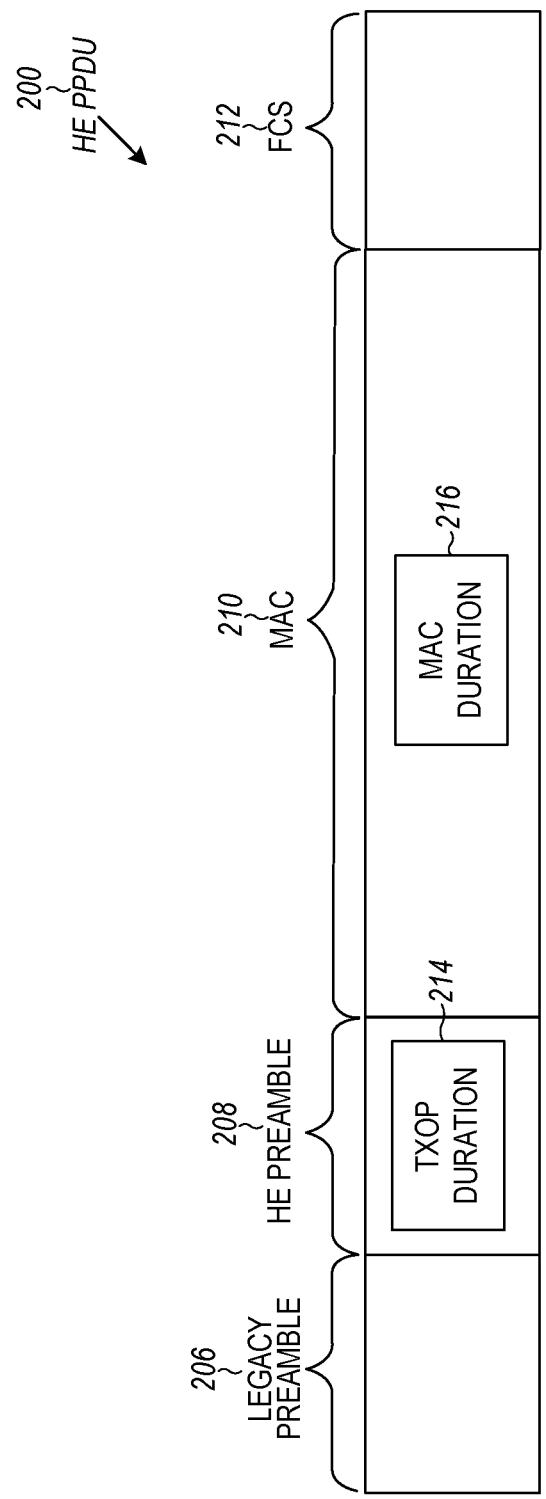
FIG. 2 illustrates a HE physical-layer convergence procedure (PLCP) protocol data unit (PPDU) including a transmission opportunity (TXOP) duration in accordance with some embodiments.

FIG. 2 illustrates a HE physical-layer convergence procedure (PLCP) protocol data unit (PPDU) 200 including a transmission opportunity (TXOP) duration 214 in accordance with some embodiments.

The PPDU 200 includes a legacy preamble 206, a HE preamble 208, a media access control (MAC) layer portion 210, and a frame check sequence (FCS) 212.

The legacy preamble 206 may include one or more of the following fields: legacy short-training fields (STFs) (L-STF), legacy long-training fields (LTFs) (L-LTFs), legacy signal fields (L-SIGs), and etc. The legacy preamble 206 may indicate that the PPDU is an HE PPDU.

The HE preamble 208 may include one or more of the following fields: HE signal fields (e.g., HE-SIG-A, repeated HE-SIG-A, HE-SIG-B, HE-SIG-C), HE-STFs, HE-LTFs, etc. The HE preamble 208 may include a TXOP duration field 214. Some HE PPDUs 200 that include the MAC 210, may also include a MAC duration field 216.

The MAC duration field 216 may be 16 bits. The TXOP duration 214 may be fewer bits than the MAC duration 216. The TXOP duration 214 may be 15 bits to 2 bits. In some embodiments, the TXOP duration 214 is 7 bits. The TXOP duration 214 may be part of a HE-SIG-A field. The TXOP duration 214 field and the MAC duration 216 field have different granularities and may have different ranges. For example, MAC duration 216 may be 15 bits with a range of 0 to 32,000 µs and a granularity of 1 µs. As another example, the TXOP duration 214 may be 7 bits with a range from 0 to 256 µs with a granularity of 8 µs. As another example, the TXOP duration 214 may be 7 bits with a range from 0 to 8 ms with granularity of 256 µs. In some embodiments, the TXOP duration 214 field is termed a duration field, which may be in the HE-SIG-A preamble portion of the HE PPDU 200.

In some embodiments, TXOP duration 214 field includes a first field that is an integer for the duration and a second field that indicates a granularity of the duration. In some embodiments, a constant may be added to the TXOP duration 214 field. In some embodiments, the TXOP duration 214 field includes a third field that indicates whether a constant should be added to the value indicated by the TXOP duration 214.

In some embodiments, the TXOP duration 214 is not required to set up an entire TXOP limit. TXOP limit may be the maximum amount of time a master station 102 and/or HE station 104 may have a TXOP. In some embodiments, the TXOP duration 214 begins after the transmission of the HE PPDU 200 that includes the TXOP duration 214.

In an example, the TXOP duration 214 in the HE preamble 208 can be used for network allocation vector (NAV) setting. More specifically, the TXOP duration 214 can be used to indicate a time duration during which an STA receiving the HE PPDU 200 can refrain from transmission (i.e., the time duration can start from the end of reception of the HE PPDU 200 and can last for the TXOP duration 214). In another example, NAV setting can be indicated to a receiving station using the MAC duration 216 in the MAC portion 210 of the PPDU 200.

In an example, due to the limited number of bits in the HE preamble 208, 7 bits may be allocated to the TXOP Duration field 214, which is less than the bits allocated to the MAC duration field 216 (e.g., 16 bits) in the MAC header 210 for NAV setting. As a result, in some instances, the TXOP Duration field 214 may not be able to indicate duration information that requires more than 7 bits, which may result in over-protection or less protection when NAV settings are set using the TXOP duration field 214.

To resolve this issue, in an example embodiment, a disable flag can be reserved in the TXOP duration field 214 to indicate no duration information is contained in the HE preamble 208. For example, in some embodiments, the TXOP duration 214 may indicate that it does not include duration information by setting the TXOP duration field 214 bits to all 1's or all 0's (i.e., setting the disable flag) to indicate that the TXOP duration 214 does not carry duration information and the TXOP duration field is disabled.

In some embodiments, the TXOP duration 214 may have a different number of bits depending on the type of the HE PPDU 200. For example, in some embodiments a HE PPDU 200 that is a HE trigger based (TB) PPDU may have a same number of bits as the MAC duration 216 to match the range and granularity of the MAC duration 216, e.g., 15 bits compared to 7 bits for a HE single user (SU) PPDU or a HE multiple user (MU) PPDU. The range of the MAC duration 216, in some embodiments, is 32 ms.

In some embodiments, the master station 102 is configured to set the MAC duration 216 and/or TXOP duration 214 to an end of a TXOP, which may include multiple exchanges of HE PPDUs 200 between the master station 102 and the HE stations 104. In these embodiments, the granularity of the TXOP duration 214 may have to be large to accommodate the large range which may result in other stations deferring for longer than necessary.

In some embodiments, network allocation vector (NAV) protection (as set by the TXOP duration 214 or the MAC duration 216) can be cancelled by sending a contention-free (CF)-End frame, which may take approximately 40 μs, which may be time consuming. If a master station 102 sends a CF-End it may only clear the NAVs around the master station 102 and not NAVs that were set by HE stations 104 (e.g., that were communicating with the master station 102) that were not reachable by the master station 102.

Wireless devices, e.g., master stations 102 and/or HE stations 104 may use the TXOP duration 214 and/or MAC duration 216 to determine whether to set network allocation vectors (NAVs) and defer accessing the wireless medium.

The FCS 212 may include a checksum to detect corruption of the PPDU during transmission. The HE PPDU 200 may be a HE single user (SU), HE SU extended range (ER), HE multiple user (MU), or HE TB PPDU. In some embodiments, the HE PPDU 200 may be a different type of HE PPDU 200.

In some embodiments, the HE preamble 208 may include a color field (not illustrated) that indicates a BSS of the transmitting wireless device, e.g., master station 102 or HE station 104. Some wireless device, e.g., master stations 102 or HE stations 104, may decode the HE preamble 208 that includes the color field and determine that they do not need to decode the MAC layer portion 210 of the HE PPDU 200. The master stations 102 or HE stations 104 may use the TXOP duration 214 to determine whether or not to set one or more network allocation vectors (NAVs), which, in some embodiments, is termed a virtual carrier sense (CS). The TXOP duration 214 being placed in the HE preamble 208 so that the master stations 102 or HE stations 104 do not have to decode the MAC 210 may conserve resources of the master stations 102 and/or HE stations 104, e.g., it may conserve power by not having to decode the MAC layer portion 210 of the HE PPDU 200.

Figure 3A:
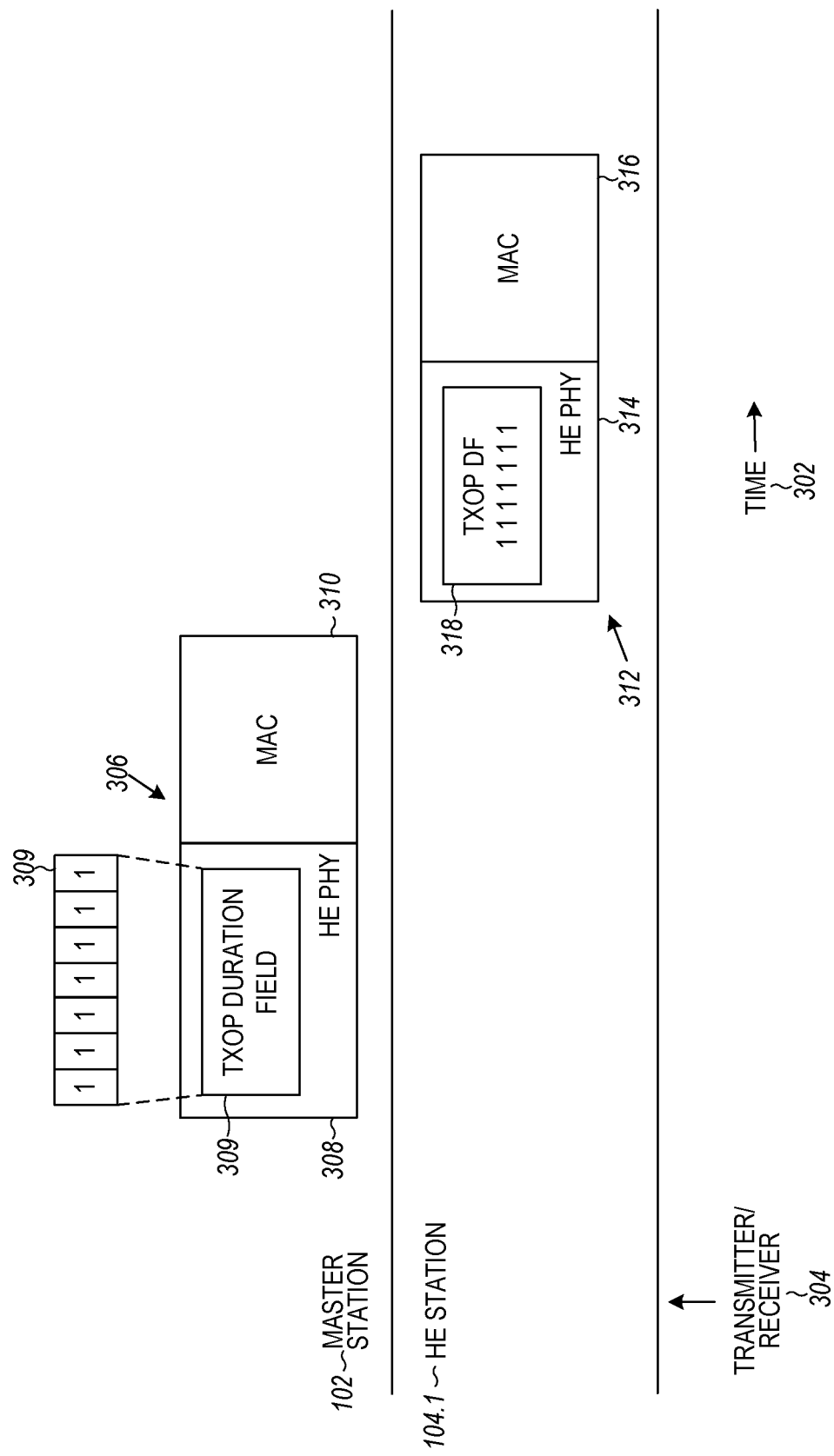
FIG. 3A and FIG. 3B illustrate methods for setting a disable flag for a TXOP duration field in accordance with some embodiments.
Figure 3B:
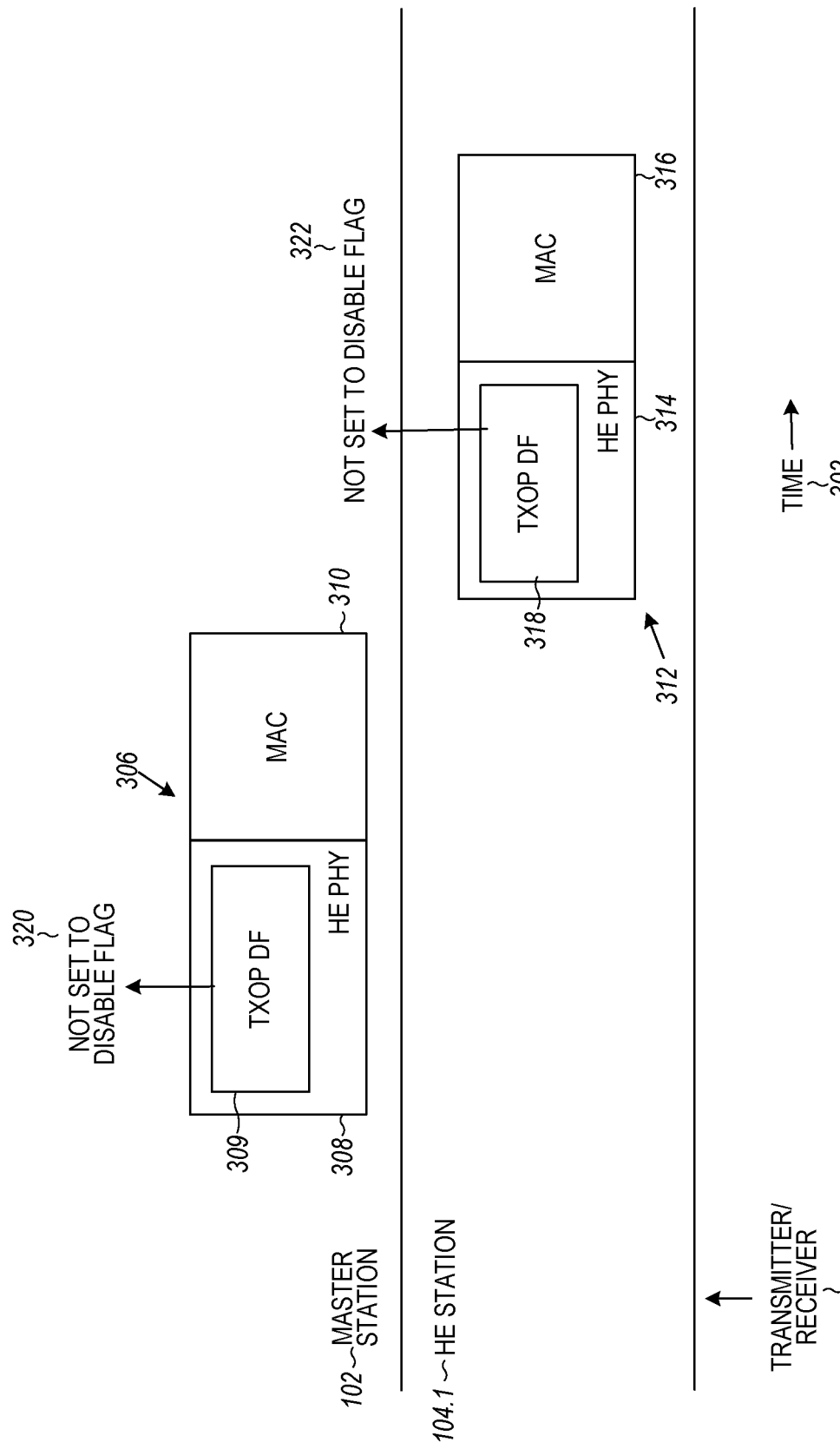

FIG. 3A and FIG. 3B illustrate methods for setting a disable flag for a TXOP duration field in accordance with some embodiments. Referring to FIG. 3A, there is illustrated time 302 along a horizontal axis and transmitter/receiver 304 along a vertical axis. The master station 102 can be the TXOP holder, and the HE STA 104.1 can be the TXOP responder. The method 300 may start when the TXOP holder 102 transmits a HE PPDU 306. The HE PPDU 306 can include a HE PHY preamble portion 308 and a MAC portion 310 (for simplicity, only the PHY and MAC portions of the HE PPDU 306 are illustrated in FIG. 3A).

The HE PHY preamble 308 can include a TXOP duration field 309, which can be 7 bits. In an example, the TXOP holder 102 can set a disable flag by setting all bits of the TXOP duration field 309 to 1 (as seen in FIG. 3A). Even though the TXOP duration field 309 is illustrated as including only 7 bits, other bit sizes can also be used.

The PPDU 306 can be used by the TXOP holder 102 to solicit a response. For example, the PPDU 306 can be a trigger frame, soliciting a trigger frame response by the TXOP responder (e.g., STA 104.1). In an example, in instances when the PPDU that solicits the response is a HE PPDU (e.g., 306), the TXOP duration field 309 in the HE PPDU can be set to a disable flag (e.g., by setting all bits of the TXOP duration field 309 to 1s). The TXOP responder (e.g., 104.1) can respond with a HE PPDU 312, which includes a HY PHY preamble 314 and a MAC preamble 316. Additionally, the TXOP responder 104.1 can use the same disable flag as communicated by the TXOP holder 102 in its own response. Consequently, the TXOP responder 104.1 can set the disable flag in the response PPDU 312 by setting all bits of the TXOP duration field 318 to 1s.

Referring to FIG. 3B, there is illustrated a method 318, which is similar to the method 300 of FIG. 3A, except the disable flag in the TXOP holder's PPDU 306 is not set. More specifically, the TXOP duration field 309 does not include (or does not use) a set disable flag (as indicated at 320). Put another way, the bits of the TXOP duration field 309 are not all set to 1s, as illustrated in FIG. 3A where the disable flag was set. In this case, the TXOP responder 104.1 will also not use a disable flag in the TXOP duration field 318 (e.g., as indicated by 322).

In an example, the TXOP holder 102 can transmit the HE PPDU 306 as a trigger frame. The TXOP responder 104.1 can respond with a response PPDU 312, which can be a HE TB PPDU. In an example, the PPDU 306 sent by the TXOP holder 102 can be an HE extended range (ER) PPDU, and the response PPDU from the TXOP responder 104.1 can be a HE ER SU PPDU. Other types of PPDUs can be used as well, to indicate presence (or absence) of a disable flag for the TXOP duration field.

In an example, the TXOP holder 102 can send a HE PPDU 306 to initiate the TXOP, and also use a disable flag for the TXOP duration field 309. In this case, a BSS color field of the HE PHY preamble (e.g., HE-SIG-A preamble) 308 can be set to a reserved BSS color (e.g., BSS Color=0) such that HE STAs (e.g., 104.1) that receives the HE PPDU 306 must decode the MAC portion 310 of the HE PPDU 306. The MAC portion 310 can be decoded so that the receiving station 104.1 can still obtain NAV settings (e.g., using MAC duration in the MAC preamble 310) in order to set NAV.

In an example, the TXOP holder 102 can use signaling within the MAC portion 310 of the PPDU 306 to indicate whether or not a disable flag shall be used in the TXOP duration field of the responding HE PPDU (e.g., 312). Some examples of signaling in the MAC portion are provided herein below.

In an example, if the soliciting PPDU (e.g., 306) contains a trigger frame, then one bit in the common info field of the trigger frame can be used as the signaling.

In an example, if the soliciting PPDU (e.g., 306) contains a trigger frame, then one bit in the type dependent common info field of the trigger frame can be used as the signaling.

In an example, if the soliciting PPDU (e.g., 306) contains a trigger frame, then one bit in the per user info field of the trigger frame can be used as the signaling.

In an example, if the soliciting PPDU (e.g., 306) contains a trigger frame, then one bit in the type dependent per user info field of the trigger frame can be used as the signaling.

In an example, if the soliciting PPDU (e.g., 306) does not contain a trigger frame, then one bit in the HE Aggregated (HE-A) control field in the MAC header of the soliciting PPDU can be used for the signaling.

In an example, a signal can be added to the MAC header (e.g., 310) of the soliciting PPDU (e.g., 306) to determine the value in the TXOP duration field (e.g., 318) of the responding HE PPDU (e.g., 312). Some examples of signaling in the MAC portion are provided herein below.

In an example, if the soliciting PPDU (e.g., 306) contains a trigger frame, then the TXOP duration field (e.g., 318) in the responding PPDU can be indicated in the common info field of the trigger frame.

In an example, if the soliciting PPDU (e.g., 306) does not contain a trigger frame, then the TXOP duration field (e.g., 318) in the responding PPDU can be indicated in the HE A-control field in the MAC header of the soliciting PPDU (e.g., 306).

Figure 4:
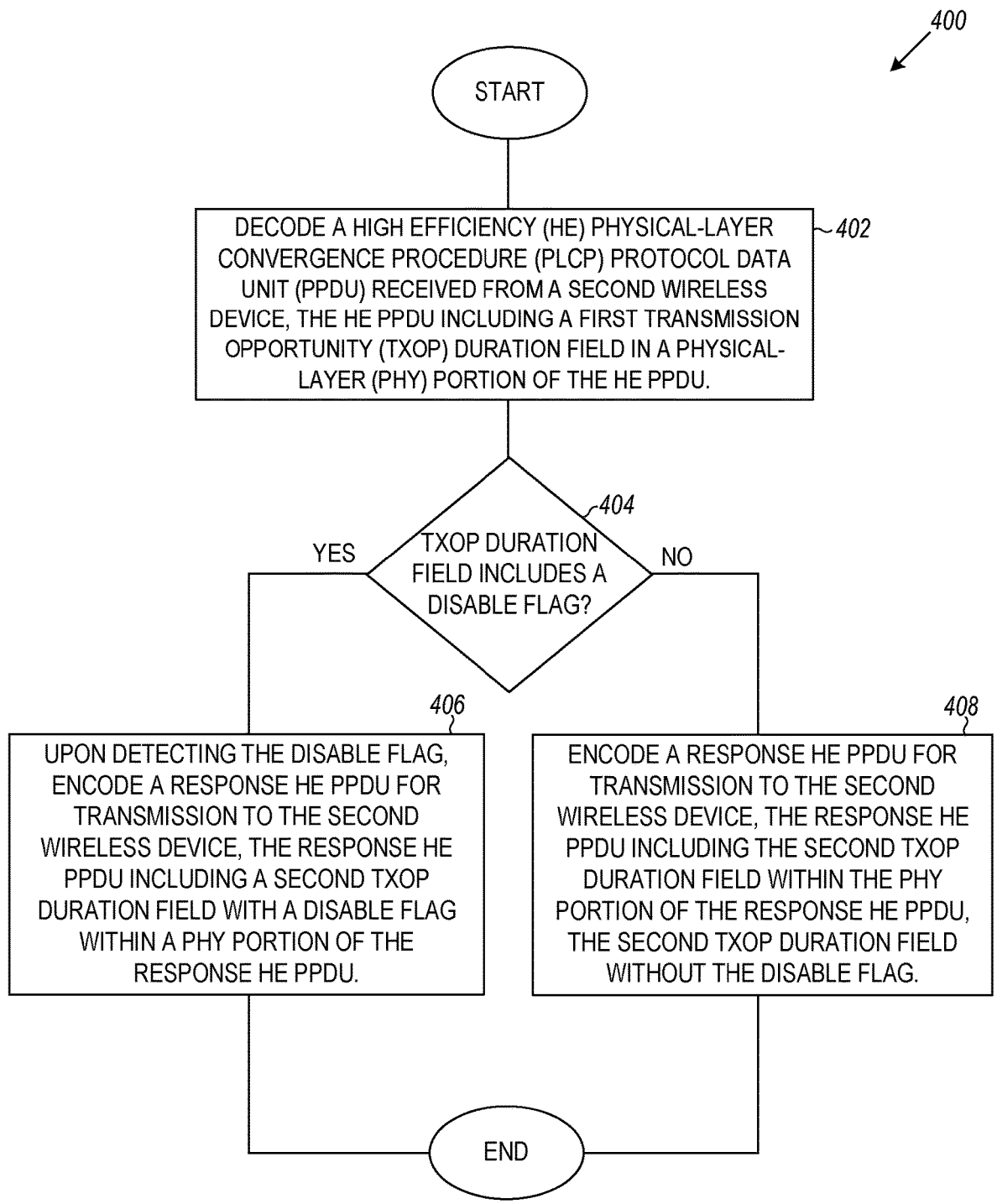
FIG. 4 illustrates a flow diagram of example method for encoding a response HE PPDU based on a TXOP duration field disable flag in accordance with some embodiments.

FIG. 4 illustrates a flow diagram of example method for encoding a response HE PPDU based on a TXOP duration field disable flag in accordance with some embodiments. Referring to FIG. 4, the example method 400 may start at 402, when a high efficiency (HE) physical-layer convergence procedure (PLCP) protocol data unit (PPDU) received at a first wireless device from a second wireless device can be decoded. For example, a first wireless device (e.g., TXOP responder 104.1) can receive the HE PPDU 306 from a second wireless device (e.g., TXOP holder 102). The HE PPDU (e.g., 306) can include a first transmission opportunity (TXOP) duration field (e.g., 309) in a physical-layer (PHY) portion (e.g., 308) of the HE PPDU. At 404, it may be determined whether the TXOP duration field includes a disable flag. For example, such determination may be performed based on bit values of the TXOP duration field (e.g., 309). For example, the disable flag can be considered present (or set) when all bits of the TXOP duration field are set to 1. The disable flag (when set or present) indicates absence of duration information in the TXOP duration field (e.g., 309). Upon detecting the disable flag, at 406, a response HE PPDU (e.g., 312) can be encoded for transmission to the second wireless device. The response HE PPDU can include a second TXOP duration field (e.g., 318) with a disable flag within a PHY portion (e.g., 314) of the response HE PPDU. For example, the disable flag within the response PPDU 312 can be set by setting all bits of the TXOP duration field 318 to 1s.

At 408, upon determining that the TXOP duration field (e.g., 309) does not include the disable flag, the response HE PPDU (e.g., 312) can be encoded for transmission to the second wireless device (e.g., 102), where the response HE PPDU includes a TXOP duration field (e.g., 318) within the PHY portion of the response HE PPDU (e.g., 312), with the TXOP duration field (e.g., 318) being without the disable flag.

Figure 5:
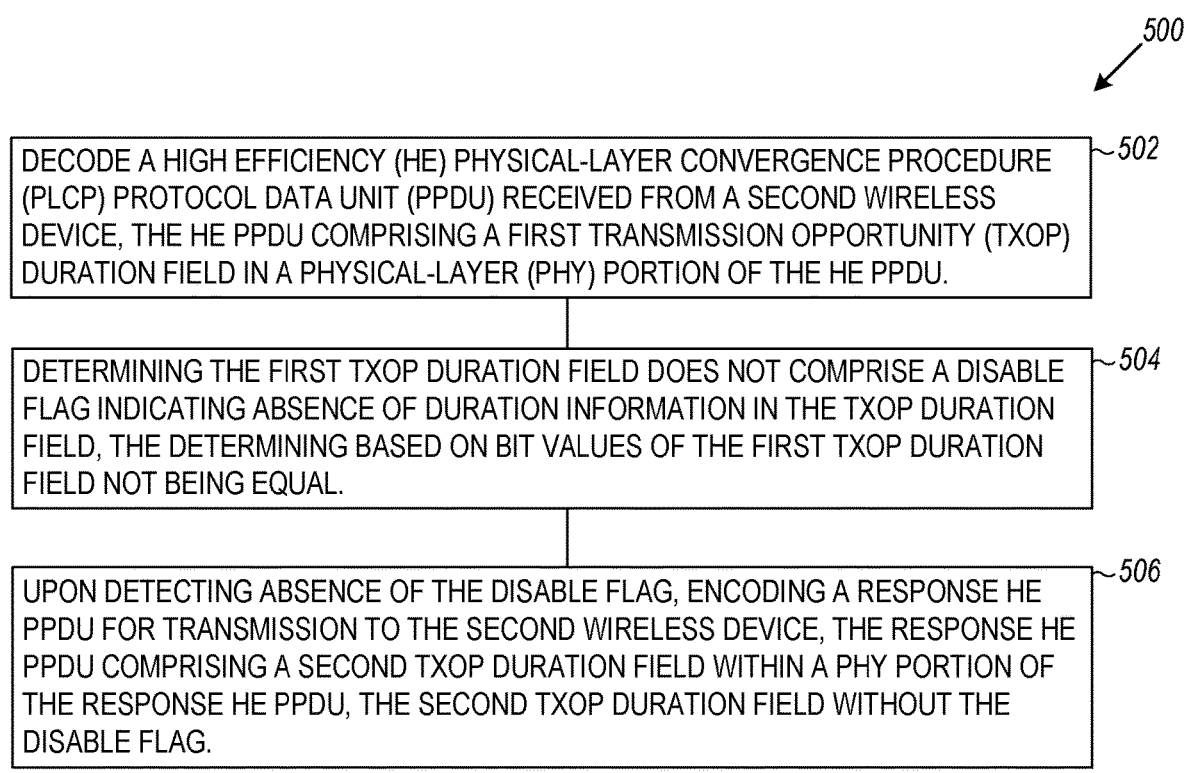
FIG. 5 illustrates a flow diagram of another example method for encoding a response HE PPDU based on a TXOP duration field disable flag in accordance with some embodiments.

FIG. 5 illustrates a flow diagram of another example method for encoding a response HE PPDU based on a TXOP duration field disable flag in accordance with some embodiments. Referring to FIG. 5, the example method 500 may start at 502, when a high efficiency (HE) physical-layer convergence procedure (PLCP) protocol data unit (PPDU) (e.g., 306) received at a first wireless device (e.g., TXOP responder 104.1) from a second wireless device (e.g., TXOP holder 102) can be decoded. The HE PPDU (e.g., 306) can include a first transmission opportunity (TXOP) duration field (e.g., 309) in a physical-layer (PHY) portion (e.g., 308) of the HE PPDU. At 504, the first wireless device (e.g., TXOP responder 104.1) can determine the first TXOP duration field (e.g., 309) does not include a disable flag indicating absence of duration information in the TXOP duration field. For example, the determining can be based on bit values of the first TXOP duration field not being equal (or not being equal to a pre-determined value, such as 1). At 506, upon detecting absence of the disable flag, the first wireless device (e.g., TXOP responder 104.1) can encode a response HE PPDU (e.g., 312) for transmission to the second wireless device (e.g., TXOP holder 102). The response HE PPDU (e.g., 312) can include a second TXOP duration field (e.g., 318) within a PHY portion (e.g., 314) of the response HE PPDU, the second TXOP duration field without the disable flag.

Figure 6:
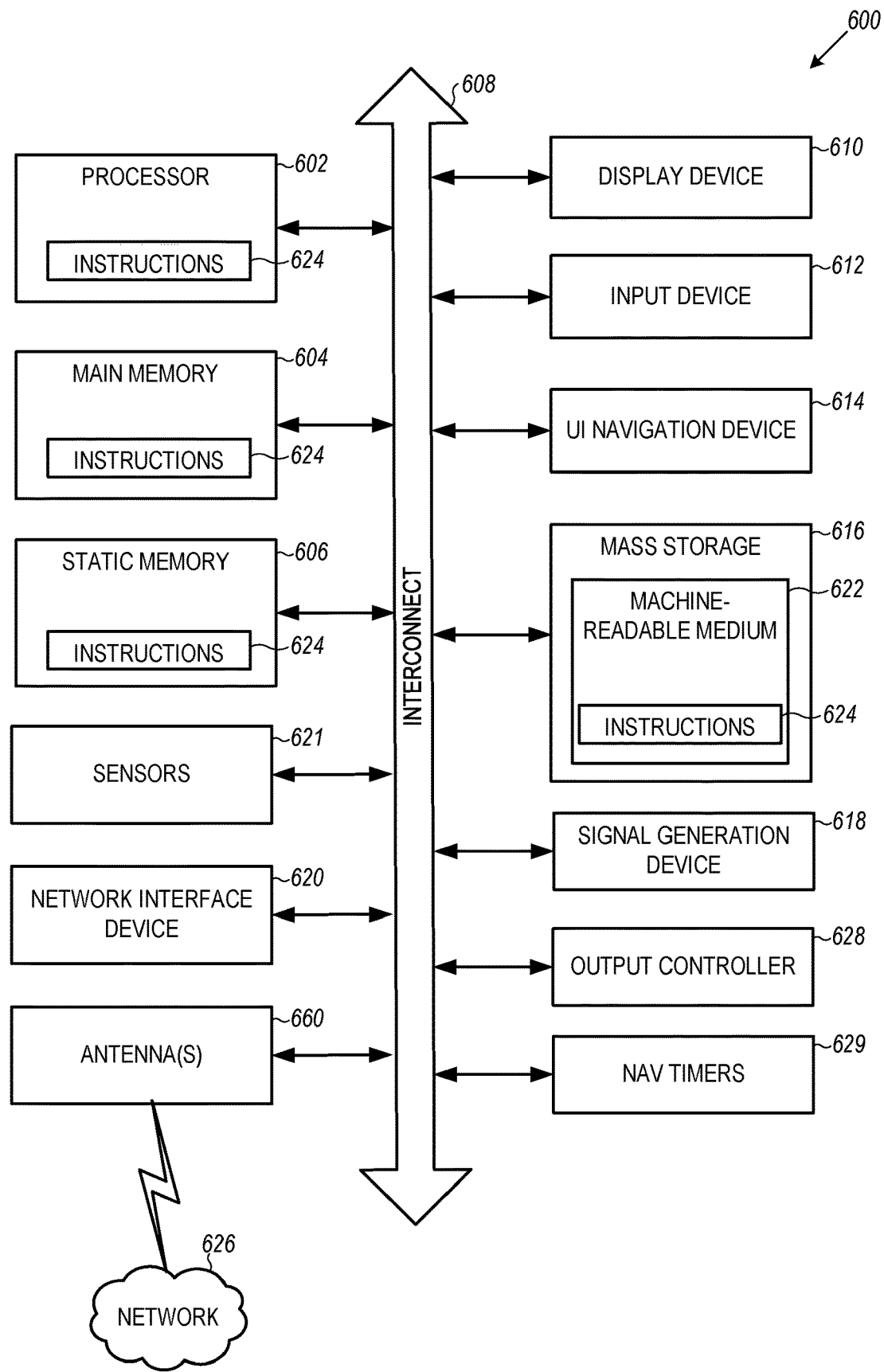
FIG. 6 illustrates a block diagram of an example machine up on which any one or more of the techniques (e.g., methodologies) discussed herein may perform.

FIG. 6 illustrates a block diagram of an example machine 600 up on which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments.

Example 1 is an apparatus of a wireless device comprising: memory; and processing circuitry coupled to the memory, the processing circuitry configured to: decode a high efficiency (HE) physical-layer convergence procedure (PLCP) protocol data unit (PPDU) received from a second wireless device, the HE PPDU comprising a first transmission opportunity (TXOP) duration field in a physical-layer (PHY) portion of the HE PPDU; detect whether the TXOP duration field comprises a disable flag based on bit values of the TXOP duration field, the disable flag indicating absence of duration information in the TXOP duration field; and upon detecting the disable flag, encode a response HE PPDU for transmission to the second wireless device, the response HE PPDU comprising a second TXOP duration field with a disable flag within a PHY portion of the response HE PPDU.

In Example 2, the subject matter of Example 1 optionally includes wherein to detect whether the TXOP duration field comprises the disable flag, the processing circuitry is further configured to: determine the first TXOP duration field comprises a plurality of bits, each of the plurality of bits of the first TXOP duration field having a bit value of 1 to indicate the absence of the duration information in the first TXOP duration field.

In Example 3, the subject matter of any one or more of Examples 1-2 optionally include wherein the disable flag in the second TXOP duration field is the same as the disable flag in the first TXOP duration field.

In Example 4, the subject matter of any one or more of Examples 1-3 optionally include wherein the processing circuitry is further configured to: determine the first TXOP duration field does not comprise the disable flag based on the bit values of the first TXOP duration field not being equal.

In Example 5, the subject matter of Example 4 optionally includes wherein the processing circuitry is further configured to: upon determining that the first TXOP duration field does not comprise the disable flag, encode the response HE PPDU for transmission to the second wireless device, the response HE PPDU comprising the second TXOP duration field within the PHY portion of the response HE PPDU, the second TXOP duration field without the disable flag.

In Example 6, the subject matter of any one or more of Examples 1-5 optionally include wherein the processing circuitry is further configured to: decode a MAC header in a MAC-layer portion of the HE PPDU, wherein the MAC header comprises a signaling bit to indicate the disable flag is to be used in the second TXOP duration field of the response HE PPDU.

In Example 7, the subject matter of any one or more of Examples 1-6 optionally include wherein the physical-layer portion of the HE PPDU is a high-efficiency (HE) signal (SIG) A field (HE-SIG-A).

In Example 8, the subject matter of any one or more of Examples 1-7 optionally include bits.

In Example 9, the subject matter of any one or more of Examples 1-8 optionally include wherein the HE PPDU is one from the following group: a HE single user (SU) PPDU, a HE SU extended range (ER) PPDU, a HE multiple user (MU) PPDU, or a HE trigger based (TB) PPDU.

In Example 10, the subject matter of any one or more of Examples 1-9 optionally include access point.

In Example 11, the subject matter of any one or more of Examples 1-10 optionally include wherein the processing circuitry is further configured to: configure the wireless device to transmit the HE PPDU in accordance with one or both of orthogonal frequency division multiple access (OFDMA) or multiple-user multiple-input multiple-output (MU-MIMO).

In Example 12, the subject matter of any one or more of Examples 1-11 optionally include transceiver circuitry coupled to the processing circuitry; and, one or more antennas coupled to the transceiver circuitry.

Example 13 is a method performed by a wireless device, the method comprising: decoding a high efficiency (HE) physical-layer convergence procedure (PLCP) protocol data unit (PPDU) received from a second wireless device, the HE PPDU comprising a first transmission opportunity (TXOP) duration field in a physical-layer (PHY) portion of the HE PPDU; determining the first TXOP duration field does not comprise a disable flag indicating absence of duration information in the TXOP duration field, the determining based on bit values of the first TXOP duration field not being equal; and upon detecting absence of the disable flag, encoding a response HE PPDU for transmission to the second wireless device, the response HE PPDU comprising a second TXOP duration field within a PHY portion of the response HE PPDU, the second TXOP duration field without the disable flag.

In Example 14, the subject matter of Example 13 optionally includes wherein the physical-layer portion of the HE PPDU is a high-efficiency (HE) signal (SIG) A field (HE-SIG-A).

In Example 15, the subject matter of any one or more of Examples 13-14 optionally include wherein the HE PPDU is a trigger frame, and the response HE PPDU is a high efficiency trigger-based PPDU (HE TB PPDU).

Example 16 is a non-transitory computer-readable storage medium that stores instructions for execution by one or more processors, the instructions to configure the one or more processors to cause an apparatus of a wireless device to: encode a high efficiency (HE) physical-layer convergence procedure (PLCP) protocol data unit (PPDU), wherein: the HE PPDU includes a transmission opportunity (TXOP) duration field in a physical-layer (PHY) portion of the HE PPDU, without including a media access control (MAC) duration field in a MAC-layer portion of the HE PPDU; and the TXOP duration field includes a disable flag based on equal bit values of the TXOP duration field, the disable flag indicating absence of duration information in the TXOP duration field; and configure the wireless device to transmit the HE PPDU to another wireless device.

In Example 17, the subject matter of Example 16 optionally includes to indicate the absence of the duration information in the TXOP duration field.

In Example 18, the subject matter of any one or more of Examples 16-17 optionally include wherein the one or more processors further cause the apparatus of the wireless device to: encode a basic service set (BSS) color field within the HE PPDU with a reserved BSS color value, the reserved BSS color value indicating to a receiving wireless station to decode the HE PPDU.

In Example 19, the subject matter of Example 18 optionally includes

In Example 20, the subject matter of any one or more of Examples 18-19 optionally include wherein the BSS color field is within a high-efficiency (HE) signal (SIG) A field (HE-SIG-A) of the physical-layer portion of the HE PPDU.

In Example 21, the subject matter of any one or more of Examples 16-20 optionally include wherein the one or more processors further cause the apparatus of the wireless device to: encoding signaling within the MAC-layer portion of the HE PPDU, the signaling indicating to a receiving wireless station that a disable flag shall be used within a TXOP duration field of a response HE PPDU transmitted by the receiving wireless station.

In Example 22, the subject matter of Example 21 optionally includes wherein the HE PPDU comprises a trigger frame and the signaling is a single bit within a common info field of the trigger frame.

In Example 23, the subject matter of any one or more of Examples 21-22 optionally include wherein the HE PPDU comprises a trigger frame and the signaling is a single bit within a trigger dependent common info field of the trigger frame.

In Example 24, the subject matter of any one or more of Examples 21-23 optionally include wherein the HE PPDU comprises a trigger frame and the signaling is a single bit within a per user info field of the trigger frame.

In Example 25, the subject matter of any one or more of Examples 21-24 optionally include wherein the HE PPDU comprises a trigger frame and the signaling is a single bit within a type dependent per user info field of the trigger frame.

In Example 26, the subject matter of any one or more of Examples 21-25 optionally include wherein the HE PPDU does not comprises a trigger frame and the signaling is a single bit within a high efficiency Action (HE-A) control field of the HE PPDU.

In Example 27, the subject matter of any one or more of Examples 21-26 optionally include wherein the HE PPDU comprises a trigger frame and the signaling is a plurality of bits within a common info field of the trigger frame.

In Example 28, the subject matter of any one or more of Examples 21-27 optionally include wherein the HE PPDU does not comprises a trigger frame and the signaling is a plurality of bits within a high efficiency Action (HE-A) control field of the HE PPDU.

Example 29 is a wireless device, comprising: means for encoding a high efficiency (HE) physical-layer convergence procedure (PLCP) protocol data unit (PPDU), wherein: the HE PPDU includes a transmission opportunity (TXOP) duration field in a physical-layer (PHY) portion of the HE PPDU, without including a media access control (MAC) duration field in a MAC-layer portion of the HE PPDU; and the TXOP duration field includes a disable flag based on equal bit values of the TXOP duration field, the disable flag indicating absence of duration information in the TXOP duration field; and means for configuring the wireless device to transmit the HE PPDU to another wireless device.

In Example 30, the subject matter of Example 29 optionally includes to indicate the absence of the duration information in the TXOP duration field.

In Example 31, the subject matter of any one or more of Examples 29-30 optionally include means for encoding a basic service set (BSS) color field within the HE PPDU with a reserved BSS color value, the reserved BSS color value indicating to a receiving wireless station to decode the HE PPDU.

In Example 32, the subject matter of Example 31 optionally includes

In Example 33, the subject matter of any one or more of Examples 31-32 optionally include wherein the BSS color field is within a high-efficiency (HE) signal (SIG) A field (HE-SIG-A) of the physical-layer portion of the HE PPDU.

In Example 34, the subject matter of any one or more of Examples 29-33 optionally include means for encoding signaling within the MAC-layer portion of the HE PPDU, the signaling indicating to a receiving wireless station that a disable flag shall be used within a TXOP duration field of a response HE PPDU transmitted by the receiving wireless station.

In Example 35, the subject matter of Example 34 optionally includes wherein the HE PPDU comprises a trigger frame and the signaling is a single bit within a common info field of the trigger frame.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficient station (HE STA) comprising: memory; and processing circuitry coupled to the memory, the processing circuitry configured to:

decode a high efficiency (HE) physical-layer convergence procedure protocol data unit (HE PPDU) received from an access point (AP), the received HE PPDU comprising a transmission opportunity (TXOP) duration parameter, the received HE-PPDU comprising a trigger frame soliciting a response, determine if the TXOP duration parameter of the received HE PPDU indicates duration information for network allocation vector (NAV) setting or if the TXOP duration parameter comprises a disable flag indicating no duration information;

if the TXOP duration parameter comprises the disable flag, the processing circuitry is configured to refrain from setting a NAV of the HE STA based on the TXOP duration parameter;

if the TXOP duration parameter indicates duration information, the processing circuitry is configured to set the NAV of the HE STA based on the duration information indicated by the TXOP duration parameter; and encode a HE trigger-based (TB) PPDU for transmission to the AP in response to the received HE PPDU, wherein the processing circuitry is to set a TXOP duration parameter of the HE TB PPDU to the disable flag to indicate no duration information if the TXOP duration parameter of the received HE PPDU comprised the disable flag, and wherein the processing circuitry is to set the TXOP duration parameter of the HE TB PPDU based on the TXOP duration parameter of the received HE PPDU if the TXOP duration parameter of the received HE PPDU indicated duration information.

2. The apparatus of claim 1 wherein the TXOP duration parameter of the received HE PPDU is a physical-layer (PHY) parameter.

3. The apparatus of claim 2 wherein the received HE PPDU comprises a HE signal A field (HE-SIG-A), and wherein a value of the TXOP duration parameter of the received HE PPDU is indicated in a TXOP field of the HE-SIG-A.

4. The apparatus of claim 1 wherein if the TXOP duration parameter of the received HE PPDU comprises the disable flag, the duration information is unspecified, the processing circuitry is configured to refrain from updating the NAV of the HE STA based on the TXOP duration parameter.

5. The apparatus of claim 1 wherein if the TXOP duration parameter of the received HE PPDU comprises the disable flag, the NAV is disabled.

6. The apparatus of claim 1, wherein the memory is configured to store an indication of the TXOP duration parameter of the received HE PPDU.

7. The apparatus of claim 1 further comprising transceiver circuitry coupled to the processing circuitry.

8. The apparatus of claim 7 further comprising two or more antennas coupled to the transceiver circuitry configured for multiple-input multiple output (MIMO) communication.

9. A non-transitory computer-readable storage medium that stores instructions for execution by processing circuitry of a high-efficient station (HE STA) to configure the HE STA to:

decode a high efficiency (HE) physical-layer convergence procedure protocol data unit (HE PPDU) received from an access point (AP), the received HE PPDU comprising a transmission opportunity (TXOP) duration parameter, the received HE-PPDU comprising a trigger frame soliciting a response, determine if the TXOP duration parameter of the received HE PPDU indicates duration information for network allocation vector (NAV) setting or if the TXOP duration parameter comprises a disable flag indicating no duration information;

if the TXOP duration parameter comprises the disable flag, the processing circuitry is configured to refrain from setting a NAV of the HE STA based on the TXOP duration parameter;

if the TXOP duration parameter indicates duration information, the processing circuitry is configured to set the NAV of the HE STA based on the duration information indicated by the TXOP duration parameter; and encode a HE trigger-based (TB) PPDU for transmission to the AP in response to the received HE PPDU, wherein the processing circuitry is to set a TXOP duration parameter of the HE TB PPDU to the disable flag to indicate no duration information if the TXOP duration parameter of the received HE PPDU comprised the disable flag, and wherein the processing circuitry is to set the TXOP duration parameter of the HE TB PPDU based on the TXOP duration parameter of the received HE PPDU if the TXOP duration parameter of the received HE PPDU indicated duration information.

10. The non-transitory computer-readable storage medium of claim 9 wherein the TXOP duration parameter of the received HE PPDU is a physical-layer (PHY) parameter.

11. The non-transitory computer-readable storage medium of claim 10 wherein the received HE PPDU comprises a HE signal A field (HE-SIG-A), and wherein a value of the TXOP duration parameter of the received HE PPDU is indicated in a TXOP field of the HE-SIG-A.

12. The non-transitory computer-readable storage medium of claim 9 wherein if the TXOP duration parameter of the received HE PPDU comprises the disable flag, the duration information is unspecified, the processing circuitry is configured to refrain from updating the NAV of the HE STA based on the TXOP duration parameter.

13. The non-transitory computer-readable storage medium of claim 9 wherein if the TXOP duration parameter of the received HE PPDU comprises the disable flag, the NAV is disabled.

14. An apparatus of an access point (AP) comprising: memory; and processing circuitry coupled to the memory, the processing circuitry configured to:

encode a high efficiency (HE) physical-layer convergence procedure protocol data unit (HE PPDU) for transmission to an HE station (HE STA), the transmitted HE PPDU comprising a transmission opportunity (TXOP) duration parameter, the transmitted HE-PPDU comprising a trigger frame soliciting a response, wherein the processing circuitry is configured to:

set the TXOP duration parameter of the transmitted HE PPDU to indicate duration information for network allocation vector (NAV) setting by the HE STA or set the TXOP duration parameter to a disable flag to indicate no duration information;

decode a HE trigger-based (TB) PPDU received from the HE STA in response to the transmitted HE PPDU, wherein a TXOP duration parameter of the HE TB PPDU comprises the disable flag if the TXOP duration parameter of the transmitted HE PPDU comprised the disable flag, and wherein the TXOP duration parameter of the HE TB PPDU is set based on the TXOP duration parameter of the transmitted HE PPDU if the TXOP duration parameter of the transmitted HE PPDU indicated duration information.

15. The apparatus of claim 14, wherein to disable the NAV of the HE STA, the wherein the processing circuitry is configured to set the TXOP duration parameter to the disable flag.

16. The apparatus of claim 15 wherein the TXOP duration parameter of the received HE PPDU is a physical-layer (PHY) parameter.

17. The apparatus of claim 15 wherein the received HE PPDU comprises a HE signal A field (HE-SIG-A), and
wherein a value of the TXOP duration parameter of the received HE PPDU is indicated in a TXOP field of the HE-SIG-A.

18. The apparatus of claim 15 wherein if the TXOP duration parameter of the received HE PPDU comprises the disable flag, the duration information is unspecified, the processing circuitry is configured to refrain from updating the NAV based on the TXOP duration parameter.

19. The apparatus of claim 15 wherein if the TXOP duration parameter of the received HE PPDU comprises the disable flag, the NAV is disabled.

20. The apparatus of claim 14, wherein the memory is configured to store an indication of the TXOP duration parameter of the received HE PPDU.

\* \* \* \* \*